Patented May 20, 1930

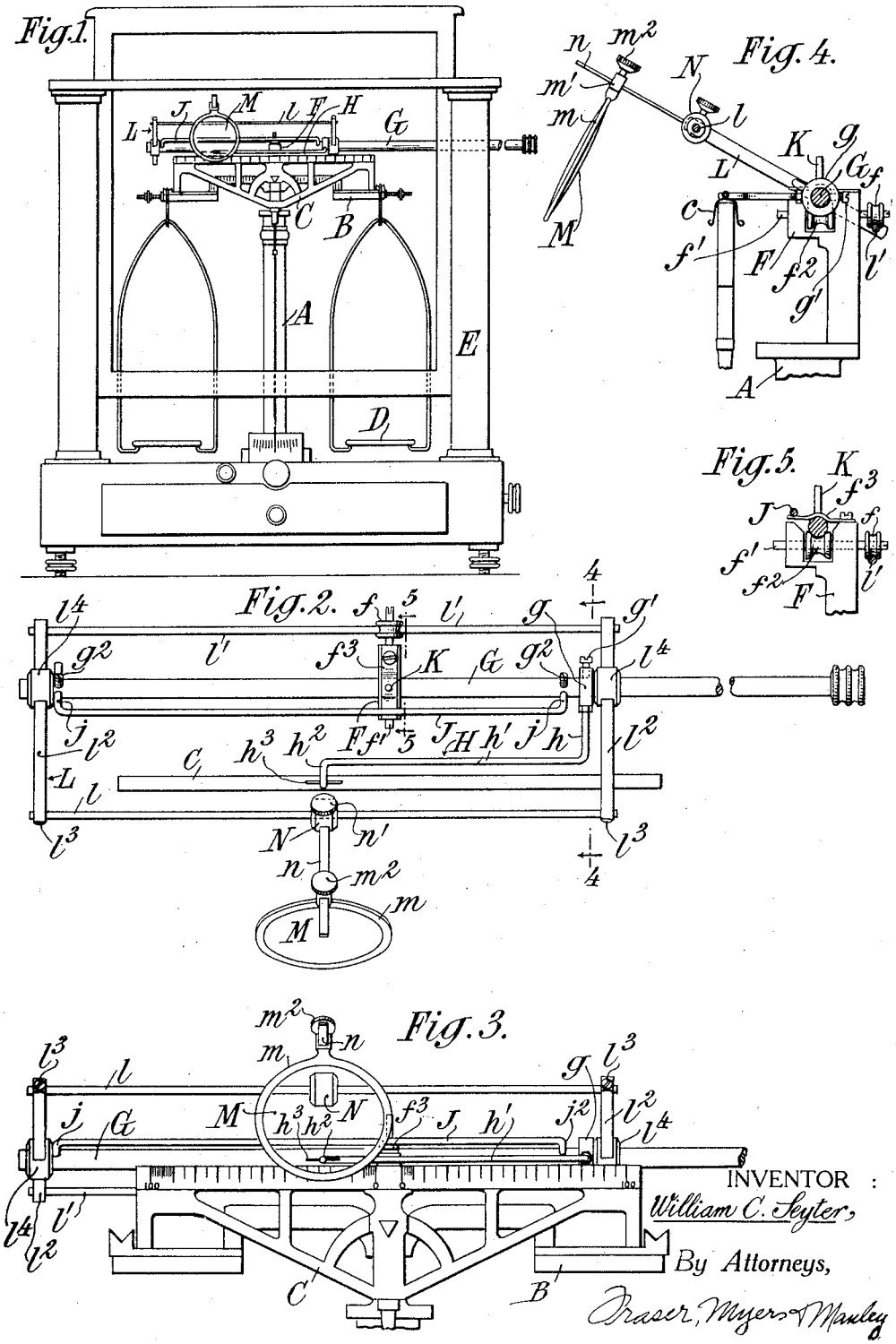

1,759,139

UNITED STATES PATENT OFFICE

WILLIAM C. SEYTER, OF UNION CITY, NEW JERSEY, ASSIGNOR TO THE TORSION BALANCE COMPANY, OF NEW YORK, N. Y., A CORPORATION OF NEW YORK

BALANCE

Application filed May 21, 1929. Serial No. 364,741.

The present invention relates to analytical balances or weighing scales and aims to provide certain improvements therein.

In the carrying out of fine weighing operations with an analytical balance it has been heretofore proposed to employ a magnifying lens to facilitate reading the exact position of the rider on the balance beam. In the constructions employing such lenses, however, the various means for supporting and moving the lenses have been objectionable for one reason or another.

According to the present invention I provide a novel construction of support upon which the lens is adjustably mounted, which support is preferably mounted upon the rider rod so as to be movable longitudinally but not axially therewith when the rod is moved in transferring the rider from one point on the beam to another. The construction and mounting are such that once the lens is adjustably positioned in focus for a particular operator it will always occupy said position in front of the rider irrespective of its location on the beam, thereby facilitating the weighing operation.

In the accompanying drawings wherein I have shown the invention applied to the type of balance having guiding and limiting means for the rider hook, as embodied in my prior Patent No. 1,599,495, dated September 14, 1926;

Figure 1 is a front elevation of an analytical balance embodying my invention.

Fig. 2 is a top plan view on an enlarged scale of the balance beam, the rider rod construction and the lens supporting means of the balance shown in Fig. 1, the enclosing case being omitted.

Fig. 3 is a front elevation on an enlarged scale of the parts shown in Fig. 2.

Fig. 4 is a transverse section taken on the line 4—4 of Fig. 2.

Fig. 5 is a transverse section taken on the line 5—5 of Fig. 2.

Referring to the drawings wherein the invention is shown as applied to a conventional form of analytical balance embodying the features of improvement set forth in my prior patent above referred to, A indicates a column upon which is mounted a beam arrest B and an equal arm balance beam C, from the ends of which are suspended the scale pans D, said parts being all mounted within an enclosing case E.

Extending through one wall of the enclosing case and supported by a suitable bearing F mounted upon the column A is a slidable rider rod G fitted with a rider hook H and a supplemental guide rod J. This supplemental guide rod is adapted, by engagement with a spring clip $f^3$ mounted on the rider rod bearing F, to limit the position of the engaging end of the rider hook with respect to the balance beam and to guide said rider hook end parallel to said beam. It is also adapted, through engagement with a pin K mounted on said spring clip $f^3$, to limit the disengaging position of the rider hook.

The rider hook H comprises a part $h$ extending into and adjustable with respect to a collar $g$ mounted on the rider rod, a part $h'$ extending at substantially a right angle to the part $h$ and a hook end part $h^2$ extending at right angles to the part $h'$ adapted to ride in predetermined spaced relation over the top of the balance beam C. The hook end $h^2$ is fitted with a pin $h^3$ extending parallel to the balance beam and adapted to engage the rider $c$ thereon. Preferably the rider hook H is made of thin metal bendable about the angle connecting the parts $h$ and $h'$ so that said latter part may be bent to extend truly parallel to both the plane of the top of the balance beam and the planes of the faces of said beam. The collar $g$ is adjustable both longitudinally and axially upon the rider rod through the set screw $g'$.

The supplemental rod J has its ends $j$ bent at right angles and adjustably mounted within openings in the rider rod G through the medium of set screws $g^2$. The ends $j$, it is to be understood, may extend into the openings in the rider rod to different degrees, thereby causing the rod J to extend out of true parallelism with the rider rod G. By this means the supplemental rod J when in guiding position may serve to correct any lack of parallelism between the ride rod and the balance beam.

Mounted on the rider rod G is a lens support, indicated generally by the reference character L, which support as herein shown, consists of a frame having sides $l$, $l'$ which extend parallel to the rider rod and end members $l^2$ through which said side members extend and are secured by set screws $l^3$. The end members $l^2$ are provided with openings through which the guide rod passes. Preferably these openings are formed in enlargements $l^4$ on the end members, which enlargements are located to one side of the center of gravity of said members, or, in other words, nearer one end thereof than the other. The end members $l^2$ are mounted on the guide rod G so that one of said members abuts against the collar $g$, and the other abuts against the end $j$ farthest distant from the collar $g$. The off center of gravity mounting of the end members $l^2$ upon the rod G normally would cause the frame L to assume a position in which the longer components of the end members will extend below the axis of the slidable rod. It is desired, however, that the side member $l$ which connects the ends of the longer components of the end members should be disposed above the axis of the rider rod and also above the top edge of the balance beam, hence the side member $l'$ is disposed under a guiding abutment $f$ mounted on a pintle $f'$ extending through the rider support F below the axis of the rider rod. To reduce the frictional engagement between the side member $l'$ and said abutment, which also serves as a guide for said side member, said abutment is preferably in the form of a grooved roller. To likewise reduce the frictional guiding contact between the rider rod G and the rider support F, a second grooved roller $f^2$ is mounted on the pintle $f'$. To hold the rider rod in contact with said roller $f^2$, the spring clip $f^3$ is provided. From the description of the mounting of the lens support frame L upon the rider rod G it will be apparent that said frame will be movable longitudinally with said rod but free from movement circumferentially therewith.

For accurately ascertaining the position of the rider on the balance beam, a magnifying lens M is provided. To facilitate the weighing operations it is highly desirable that this lens be capable of adjustable mounting upon the frame L so that once the lens is focused for a particular operator it will always occupy said position in front of the rider. To accomplish this the lens is mounted in a suitable ring or bezel $m$, which, in turn, is fitted to an enlargement $m'$ having an opening therein through which extends a rod $n$ rigidly carried by a bearing sleeve N slidably mounted upon the side member $l$. The bearing sleeve N carries a thumbscrew $n'$, by means of which the sleeve may be clamped at any point longitudinally or axially of the side member $l$. The ring or bezel enlargement $m'$ likewise carries a thumbscrew $m^2$, by means of which the lens may be held in any adjusted position longitudinally of the extension $n$. It will thus be seen that in view of the longitudinal and axial adjustability of the bearing sleeve N on the side member $l$, and the lateral adjustability of the lens along the extension $n$, that said lens may be adjusted to any desired position with respect to the frame L. Preferably, of course, it will occupy a position such that it will at all times be in front of the end $h^2$ of the rider hook.

From the foregoing description, considered in conjunction with the accompanying drawings, it will be apparent that I have provided a novel construction of lens mounting for facilitating the reading of the position of a rider on a balance beam, which construction is exceedingly simple, practicable and convenient in use, since it does not require any adjustment or additional manipulation once it is set for a given operator.

While I have shown and described a preferred embodiment of my invention, I do not wish to be limited to the specific details of construction disclosed, since modifications thereof may be resorted to without departing from the spirit of the invention.

What I claim is:

1. A balance or weighing scale comprising an enclosing case, a balance beam having a calibrated scale, a movable rider, a rider carrier, a lens for viewing the position of the rider with respect to the calibrated scale, and a supporting means for the lens, said rider carrier and lens-supporting means being mounted on a movable means which is operable from the exterior of the enclosing case.

2. A balance or weighing scale comprising an enclosing case, a balance beam along which a rider is movable, a slidable rod extending through the enclosing case, a rider carrier, a lens for viewing the position of the rider on the balance beam, and a support upon which the lens is adjustably mounted, the rider carrier and the lens support being mounted on the slidable rod.

3. A balance or weighing scale comprising an enclosing case, a balance beam along which a rider is movable, a slidable rod extending through the enclosing case, a rider carrier, a lens for viewing the position of the rider on the balance beam, a support upon which the lens is adjustably mounted, the rider carrier being mounted on the slidable rod for both longitudinal and rotational movement therewith, and the lens support being mounted on the slidable rod for only longitudinal movement therewith.

4. A balance or weighing scale comprising an enclosing case, a balance beam, a movable rider, a rider carrier, a calibrated scale, a lens for viewing the position of the rider with respect to the calibrated scale, and a support for the lens having means for adjusting the position of the lens longitudinally and transversely with respect to the calibrated scale and circumferentially with respect to the axis of its longitudinal movement.

5. A balance or weighing scale comprising an enclosing case, a calibrated balance beam, a slidable rod extending through the enclosing case and movable substantially parallel to the beam when in equilibrium, a lens for viewing the calibrations on the beam, a support upon which the lens is mounted for adjustment longitudinally of the beam and circumferentially with respect to the axis of its longitudinal adjustment, said support having an opening through which the slidable rod extends, and means for normally preventing rotation of the lens support as the slidable rod is turned on its axis.

6. A balance or weighing scale comprising an enclosing case, a calibrated balance beam, a slidable rod extending through the enclosing case and movable substantially parallel to the beam when in equilibrium, a lens for viewing the calibrations on the beam, and a support upon which the lens is adjustably mounted, said support consisting of a frame having parallel sides and connecting members for said sides through which the slidable rod extends, means for preventing relative longitudinal movement of the slidable rod and lens support and means for normally preventing rotation of the lens support as the slidable rod is turned on its axis.

7. A balance or weighing scale comprising an enclosing case, a slidable rod extending through the case, a lens support mounted on said slidable rod and movable longitudinally therewith but held against rotational movement with the slidable rod, said lens support consisting of a frame having sides parallel to the slidable rod and connecting members for said sides having openings through which the slidable rod extends, said openings in the connecting members being to one side of the center of gravity thereof whereby the frame will have a tendency to assume a position with its center of gravity below the axis of the slidable rod, and an abutment engaging over one of the sides of the frame to counteract the action of gravity on the frame.

8. A balance or weighing scale comprising an enclosing case, a slidable rod extending through the case, a lens support mounted on said slidable rod and movable longitudinally therewith but held against rotational movement with the slidable rod, said lens support consisting of a frame having sides parallel to the slidable rod and connecting members for said sides having openings through which the slidable rod extends, and anti-friction guide rollers for the slidable rod and one of the sides of the lens support frame.

9. A balance or weighing scale comprising a slidable rod, a lens support mounted on said slidable rod, said lens support consisting of a frame having parallel sides and connecting members for said sides through which the slidable rod extends, one of the side members of the lens support frame having a bearing sleeve which is longitudinally and axially adjustable on said side member, said bearing sleeve having an extension projecting at a right angle to the axis of the bearing sleeve and a lens adjustably mounted on said extension.

In witness whereof I have hereunto signed my name.

WILLIAM C. SEYTER.